Dec. 11, 1962   F. A. LINDLEY, JR   3,068,466
MULTIPLE TARGET DISPLAY SYSTEM
Filed July 22, 1957   4 Sheets-Sheet 1
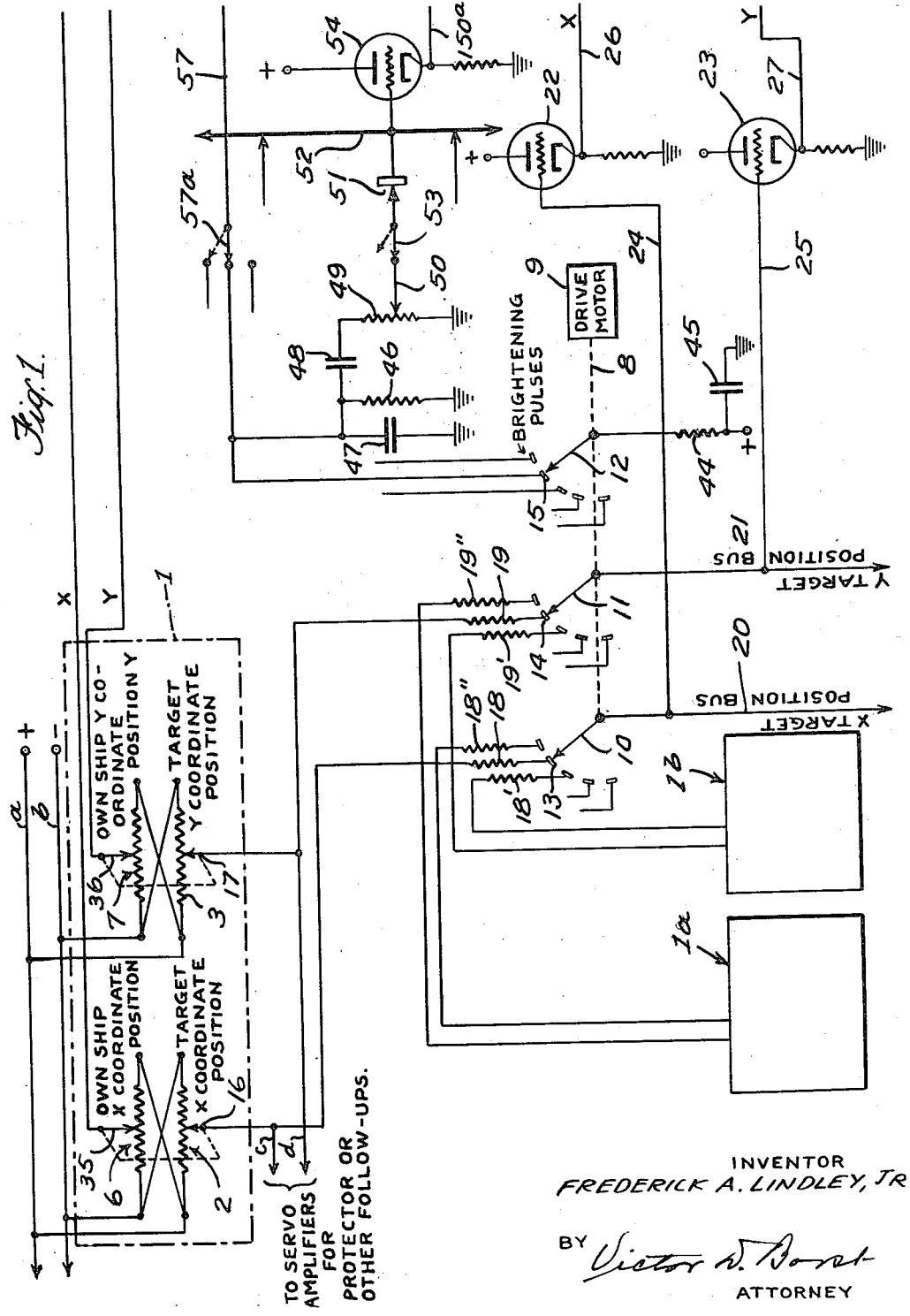
INVENTOR
FREDERICK A. LINDLEY, JR
BY
ATTORNEY

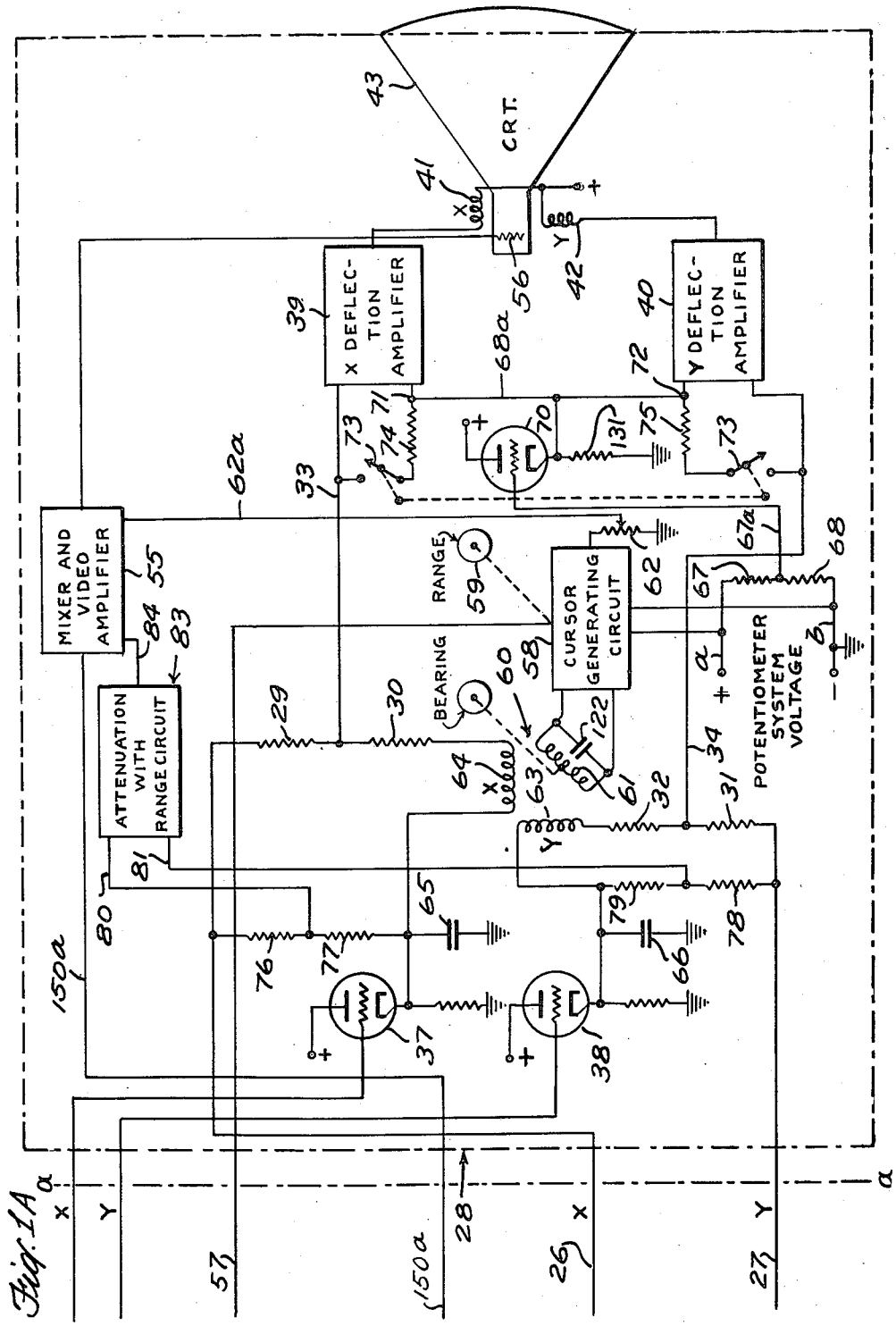

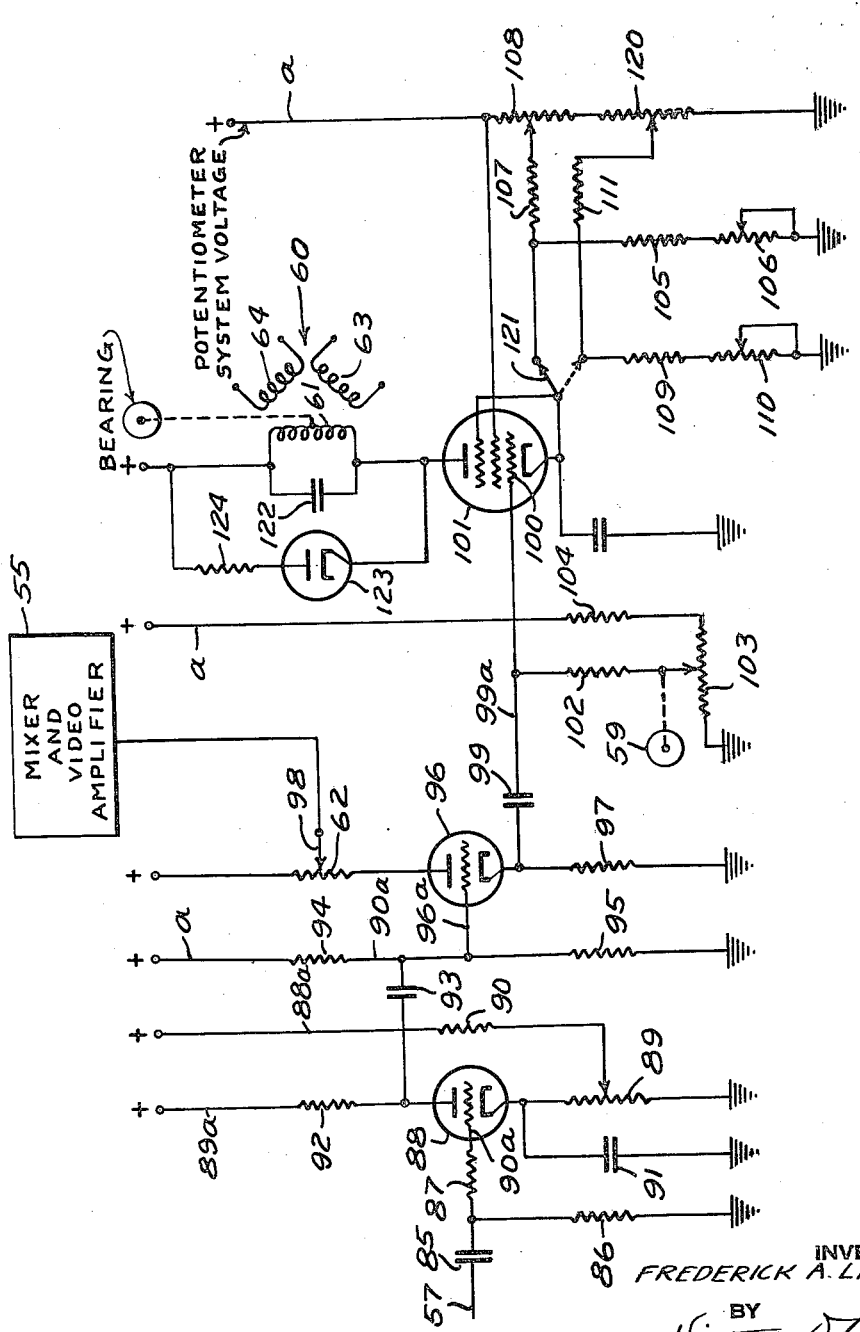

Dec. 11, 1962  F. A. LINDLEY, JR  3,068,466
MULTIPLE TARGET DISPLAY SYSTEM
Filed July 22, 1957  4 Sheets-Sheet 4

INVENTOR
FREDERICK A. LINDLEY, JR
BY
Victor D. Borst
ATTORNEY

United States Patent Office 3,068,466  
Patented Dec. 11, 1962

---

3,068,466  
MULTIPLE TARGET DISPLAY SYSTEM  
Frederick A. Lindley, Jr., Flushing, N.Y., assignor to Smith-Meeker Engineering Company, New York, N.Y., a corporation of New York  
Filed July 22, 1957, Ser. No. 673,432  
22 Claims. (Cl. 343—5)

This invention relates to an improved system for displaying multiple targets on cathode ray tubes. More particularly it relates to a cathode ray tube display system which accurately controls target positions and their illumination and includes means for accurately measuring relative range and bearing between targets as seen on the cathode ray tube screens.

An object of this invention is to provide a system for presenting multiple targets on a cathode ray tube each independently movable over a prescribed area.

A further object of this invention is to provide a multiple target display system which maintains a high degree of accuracy and linearity in the positioning of targets in the prescribed area whereby there is an accurate correlation in the displays on the various cathode ray tubes which the system may employ.

A further object of the invention is to provide a display system in which target positions can readily be servo repeated for synchronous movement of other devices such as projectors without disturbing the cathode ray tube display system or in turn the system affecting the servo repeating function.

A further object of the invention is the provision of an electrical cursor means for measuring relative range and bearing between displayed targets with a degree of precision and stability equivalent to the positioning of the targets in the prescribed area.

A further object of the invention is to provide a cathode ray tube repeater system which is adapted to display on various bases, target positions relative to any one of the targets or positions of the system without limitation as to scale of range or the size of the viewed area.

A further object of the invention provides means for shifting any individual cathode ray tube display over the prescribed area without limitation as to scale of range or the size of the viewed area.

A still further object of the invention provides means for individually generating tube brightening pulses whereby the amplitude of the brightening pulses may be individually controlled.

A still further object of the invention is to provide in a multiple target display system means for attenuating the target brightening pulses as a function of range from a reference target or position in any one or several cathode ray tube repeater units which the system may incorporate.

A still further object of the invention is to provide in a multiple target display system means for grouping and switching target brightening pulses as desired on different cathode ray tube displays.

In general, there is provided a multiple target display system which sequentially samples target $x$ and $y$ coordinate position voltages. The two coordinate voltages represent the position of a target in a prescribed area and are determined by the mechanical position of two potentiometers of high linearity. The sampling is accomplished by a three circuit commutator. One commutator circuit samples target $x$ positions. A second circuit samples corresponding target $y$ positions, and a third circuit generates individual brightening pulses for each sampled position. The brightening pulses are used for illuminating target positions on the cathode ray tubes and also for generating the cursor or position measuring voltages in the circuits associated with the cathode ray tubes.

The nature of the invention will be more fully understood by reference to the following description in conjunction with the accompanying drawings which disclose a specific embodiment of the invention.

FIG. 1 is a schematic diagram of the multiple target display system;

FIG. 1A is a schematic diagram of the system joined with FIG. 1 on line $a$—$a$;

FIG. 2 is a schematic diagram of the cursor circuit employed by the system; and

Figure 3:
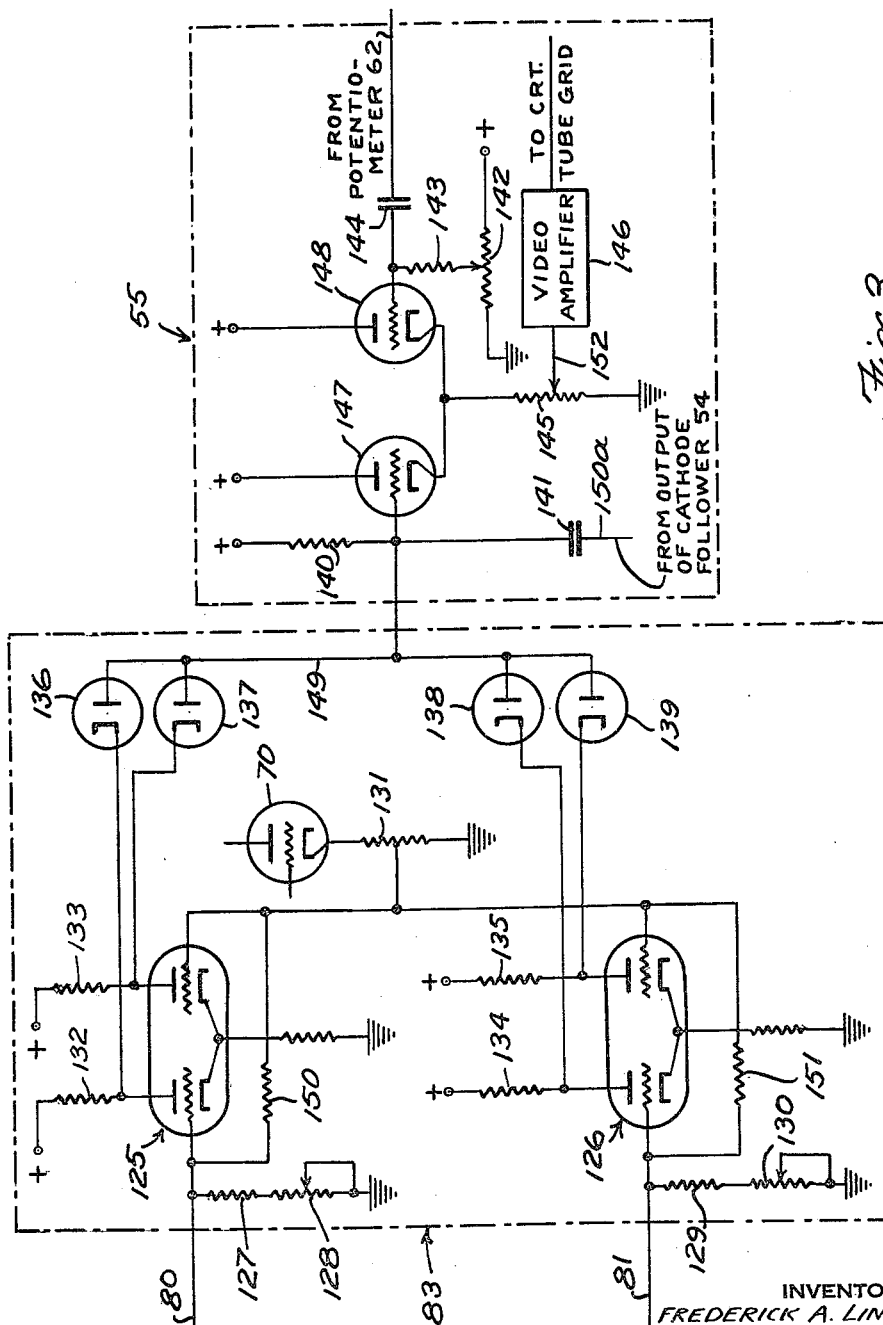
FIG. 3 is a schematic diagram of the attenuation with range circuit employed by the system.

Referring to FIG. 1 a target position unit 1 yields $x$ and $y$ coordinate positions of the target in the prescribed area as determined by potentiometers 2 and 3, respectively. Potentiometer 2 yields the target $x$ coordinate position and potentiometer 3 yields the target $y$ coordinate position. Own ship potentiometer 6 is ganged with the potentiometer 2, for own ship $x$ coordinate position, it being connected with reverse polarity to potentiometer 2 from power leads $a$ and $b$. Likewise own ship potentiometer 7 is ganged with potentiometer 3 for own ship $y$ coordinate position and is connected with reverse polarity to potentiometer 3 from the leads $a$ and $b$. The target is thus represented with target coordinate position potentiometers, and the own ship potentiometers are used when it is desired to present a target display relative to own ship's position on a cathode ray tube associated with the target. The provision of ganged potentiometers of reverse polarity allows the arms to pick off voltages on corresponding coordinate potentiometers of equal magnitude and opposite polarity. These equal and opposite voltages reference the spot at the center of the scope representing own ship position and, as will be seen, any departure therefrom as a consequence of additionally impressed voltages causes the spot to be moved on the scope to a point representative of target position relative to own ship's position.

Other target units $1^a$, $1^b$, etc. have their $x$ and $y$ target coordinate position potentiometers set in accordance with the positions respectively assigned to their targets. These target coordinate position potentiometers may or may not have associated own ship potentiometers ganged therewith depending upon whether the targets are to have their own repeater cathode ray tube with a relative display presentation. The own ship relative position potentiometers associated with their respective target position potentiometers can be unganged and independently operated where it is desired to manually or otherwise shift the reference of the display over the prescribed area rather than have the display relative to own ship's position.

A sampling switch shaft 8 driven by a motor 9 drives sampling switch or commutator arms 10, 11 and 12 in sequential engagement with a plurality of commutator contacts, each position of which represents a target. Thus, the number of displayed targets desired determine the number of contact positions necessary on the switch or commutator. The arm 10 is for $x$ target coordinate sampling and the arm 11 is for $y$ target coordinate sampling. The arm 12 generates corresponding target brightening pulses. The commutator is shown at target one position which is contact 13, contact 14 and contact 15 of the commutator.

Arms 16 and 17 of the coordinate position potentiometers 2 and 3, respectively, may be connected as shown in FIG. 1 to leads $c$ and $d$ to energize servo amplifiers for screen projectors or other types of position display follow-up devices.

The arm 16 of potentiometer 2 also connects to contact 13 of the commutator through buffer resistor 18 and the arm 17 of potentiometer 3 connects to contact 14 of the commutator through buffer resistor 19. The buffer resistors 18 and 19 are connected close to the commutator to keep switching capacity to a minimum and enhance contact life.

The commutator arm 10 feeds $x$ target bus 20 and the arm 11 of the commutator feeds $y$ target bus 21.

Each cathode ray tube repeater that is desired is fed target position voltages from the two buses through individual cathode followers such as cathode followers 22 and 23 for cathode ray tube repeater 28. Thus the grid lead 24 of cathode follower 22 connects to bus 20 and grid lead 25 of cathode follower 23 connects to bus 21. The cathode followers isolate the cathode ray tube repeaters from each other and prevent circuit loading of the commutator both as to capacity and resistance and thus prevent disturbance of potentiometers 2 and 3. The cathode follower output on cathode lead 26 feeds $x$ target position information to adder resistor 29 and the output on cathode lead 27 feeds $y$ target position information to adder resistor 31 in the cathode ray tube repeater 28.

Adder resistor 30 associated with adder resistor 29 adds the voltage which is obtained from the arm 35 of own ship potentiometer 6 through voltage isolating cathode follower 37 to the $x$ target position voltages on resistor 29. The sum output on lead 33 feeds the $x$ deflection amplifier 39. Since the own ship potentiometer 6 is connected with opposite polarity to potentiometer 2 it adds continuously a voltage that is the opposite and equal of its associated target $x$ coordinate position voltage to all the target position voltages. Thus, the output of the adder circuit as appears on lead 33 presents the own ship's position always at mid position voltage and the other targets relative to it.

Adder resistor 32 similarly adds the own ship voltage obtained from the arm 36 of the potentiometer 7 through cathode follower 38 to the $y$ target position voltages on resistor 31 with the sum appearing on lead 34 which in turn feeds the $y$ deflection amplifier 40. The same action as described for the $x$ coordinate voltages results in a $y$ relative position signal fed to the $y$ deflection amplifier 40.

If the own ship relative positioning voltages from potentiometers 6 and 7 were fixed in value the deflection amplifiers 39 and 40 would represent absolute rather than relative position voltages. If on the other hand potentiometers 6 and 7 were separated from their respectively ganged potentiometers 2 and 3 and made manually adjustable, they would enable the operator to shift the viewed area of the prescribed operating area to any position of his choice.

The output of $x$ deflection amplifier 39 feeds $x$ deflection coil 41 and the output of $y$ deflection amplifier 40 feeds $y$ deflection coil 42 thus enabling the beam of cathode ray tube 43 to be deflected over the prescribed operating area.

While the position voltages fed to the deflection coils determine the cathode ray tube beam position no illumination on the screen of the cathode ray tube occurs until an appropriate brightening pulse is applied. The appropriate target brightening pulse associated with each target position is generated by the circuit arm 12 of the scanning commutator. A positive D.C. voltage is applied to the arm 12 through series resistor 44. Capacitor 45 acts as a filter and storage capacitor for the D.C. supply voltage. The brightening circuit is phased with respect to the target positioning circuits so that contact of the arm 12 is made with contact 15 somewhat after the corresponding target $x$ and coordinate position contacts are made. Since the leading edge of the pulse thus generated on the brightening circuit contact is used to generate the target brightening pulse this phase delay allows the position voltages to become stabilized or free from switching transients before the cathode ray tube beam is turned on. If the beam were to illuminate the cathode ray tube screen before it was stabilized in position, an irregular trace would be printed instead of a dot and the represented target position would be in error.

When the arm 12, of example, makes contact with contact 15, current flows and charges grounded capacitor 47 through resistor 44 from the capacitor 45. Resistor 44 thus serves to limit current through the contact 15 and protects it from current surges. The charging of capacitor 47 through resistor 44 determines the rise time of the pulse. Grounded resistor 46 connected to the capacitor 47 functions to discharge the capacitor 47 when the circuit to contact 15 is opened after the arm sweeps past. Resistor 46 is chosen relatively high in value so as to give a gradual discharge and thus a gradual negative slope to the pulse of voltage generated. Coupling capacitor 48 and potentiometer 49 are provided to differentiate the pulse generated on contact 15. The differentiated voltage appears across potentiometer resistance 49 and the position of its arm 50 allows variation from zero to maximum of the differentiated output voltage. Since the positive rise time of the voltage on capacitor 47 is fast and its negative drop back slow the differentiated output is essentially a short positive pulse corresponding to the rise time of the pulse.

The target brightening pulse output from potentiometer arm 50 is connected to bus 52 through on-off switch 53 and crystal diode 51. The crystal diode 51 prevents other target brightening pulses occurring subsequently and similarly fed to bus 52 from being passed back into the circuit just described. Bus 52 collects those target brightening pulses thus fed to it by means of the crystal diodes. It is evident that by employing other diodes and bus systems and appropriately located switches to arrange a variety of target brightening pulse groupings. The circuit, therefore, lends itself to a high degree of flexibility in target groupings and control. A cathode follower 54 connected to bus 52 is used as isolation to prevent output circuit cables which are feeding target brightening pulses to cathode ray tube repeaters from loading and disturbing the amplitude of target brightening pulses.

The output cathode follower 54 feeds target brightening pulses via connection 150a to the mixer and video amplifier 55 which in turn feeds the target brightening pulses to the grid 56 of the cathode ray tube 43. The target brightening pulses thus turn on the beam and illuminate the targets on the screen of the cathode ray tube.

The pulse which is generated on contact 15, in addition to forming the target brightening pulse as described above, is fed on line 57 through cursor selector switch 57a to cursor generating circuit 58 and is used to generate a calibrated pulse in the rotor winding 61 of resolver 60. The amplitude of this calibrated pulse is accurately controlled by the range control 59. Additionally, the cursor generating circuit 58 converts this pulse into a cursor brightening pulse which is fed to potentiometer 62 which furnishes amplitude control for the cursor brightening pulse as fed to the mixer and video amplifier 55 by line 62a. The cursor brightening pulse being generated from the same source as the calibrated cursor pulse on resolver rotor winding 61 is automatically synchronized to the calibrated cursor pulse and serves to turn on the cathode ray tube beam and cause the cursor to be properly displayed on the screen of the cathode ray tube 43. Since the pulse generated on contact 15 corresponds to own ship's target position in the display scope repeater 28 the resulting cursor will appear at own ship's position. However, cursor selector switch 57a allows connection to pulses from other contacts than contact 15. This enables the cursor to be generated and thus appear from other target positions. This switching of cursor position is extremely useful for monitoring and other purposes.

The resolver 60 performs the task of converting the cursor range and bearing setting which is in polar form into rectangular form to match the positioning system of the targets. The two stator windings 63 and 64 of the resolver are arranged at 90° phase relationship to each other and have induced in them from rotor winding 61 the $x$ and $y$ component vectors of the rotor calibrated cursor voltage. Winding 64 which carries the $x$ component of the cursor voltage and by virtue of its series connection between the cathode follower 37 and the resistor 30 of the $x$ adder network inserts this $x$ cursor voltage component into the $x$ coordinate deflection amplifier input line 33. Similarly, winding 63, which carries the $y$ component of the cursor voltage, also by virtue of its series connection between cathode follower 38 and resistor 32 of the $y$ added network inserts the $y$ component of cursor voltage into the $y$ coordinate deflection amplifier input line 34.

Grounded capacitors 65 and 66 respectively shunt the outputs of the cathode followers 37 and 38. The capacitors provide a lower A.C. impedance to ground, thus referencing the ground end of each respective stator winding. The D.C. voltages feeding the respective cathode followers 37 and 38 change so slowly that the capacitors 65 and 66 have no effect on these cathode follower outputs. Adder resistors 30 and 32 have sufficiently high values so that resolver loading is negligible and actually have a beneficial dampening effect.

Deflection amplifiers 39 and 40 are phase inverting, push pull output amplifiers and require a fixed or steady mid-area reference voltage. This is obtained from the midpoint of two series resistors 67 and 68 placed across the power leads $a$ and $b$, the position potentiometers supply voltage. This bias voltage is fed to cathode follower 70 on lead 67ª and hence to the respective deflection amplifiers 39 and 40 by lead 68ª to amplifier input connections 71 and 72. Ganged switch 73 consisting of two circuits is arranged to connect range attenuating resistor 74 between the connection 71 and line 33 and to connect range attenuating resistor 75 between connection 72 and line 34. The resulting attenuation of the input deflection signals offers two range scales. If desired, a multiple position two circuit switch with appropriate attenuation resistors could be provided to offer a variety of range scales.

Since the cursor voltages are introduced to the target position voltages at the adder network their measuring ability through this direct comparison with target position voltages is least impaired by circuit or tube characteristics. Thus, the range scale attenuation function does not disturb the relative relationship between target position voltages and cursor voltages. Similarly, non-linearities and distortions of any sort in the deflection amplifiers, deflection coils or cathode ray tube will not disturb the cursor measuring accuracy.

The generation of the cursor or measuring voltage is explained in more detail as follows. The pulse as generated on contact 15 in the commutator is fed on line 57 through the switch 57ª to the capacitor 85 in the cursor generating circuit 58 which is shown in detail in FIG. 2. Capacitor 85 and resistor 86 differentiate this input pulse and feed it to vacuum tube amplifier limiter 88 via the grid 90ª through the grid limiting resistor 87. An adjustable bias is applied to the cathode circuit of the tube 88 by positive biasing lead 88ª which includes a bleeder resistor 90 and a variable arm of cathode resistor 89. Capacitor 91 is a cathode bypass capacitor. The limiter action of the tube by virtue of the cathode cut off bias and the grid limiting resistor 87 clips the positive input pulse on both ends as it appears in the plate output of the tube. This output appears across the plate load resistor 92 as a negative pulse of substantial amplitude. Changing the bias on tube 88 by means of the potentiometer cathode resistor 89 shifts the portion as clipped out higher or lower along the amplitude of the differentiated input pulse. Accordingly, the resulting output pulse from tube 88 is caused to vary in width for adjustment purposes. It is then applied to triode 96 through coupling capacitor 93 and grid input 96ª. The tube 96 has both cathode and plate output. The cathode output is developed across cathode resistor 97 and has the same negatively phased pulse as the tube input. The plate output is developed across the plate resistor 62 and has positive polarity. The plate resistor 62 is actually a potentiometer, the output being taken from the arm 98 which is manually adjustable. Grid bias voltage divider resistors 94 and 95 appropriately bias the tube 96 and set the amplitude of the output pulses. The positive bias voltage source is from power line $a$. The negative input pulse is sufficient to drive tube 96 beyond cut off and thus further limiting and shaping of the pulse is obtained. The positive plate output pulse on the arm 98 of the potentiometer 62 is fed to the mixer and video amplifier 55 for appropriately brightening the beam of the cathode ray tube 43 during the application of the cursor deflection voltages. The negative cathode output pulse from tube 96 is fed through coupling capacitor 99 on grid lead 99ª to the grid 100 of tube 101. The tube 101 has variable positive range bias from range potentiometer 103 set by range control 59, the bias being applied to the grid 100 through grid resistor 102 and lead 99ª. Range potentiometer 103 with series dropping resistor 104 is excited by the positive power line $a$ of the position potentiometers supply voltage. The range bias voltage from potentiometer 103 will always be proportional to the voltages from the target potentiometers 2, 3, 6 and 7 and all other potentiometers connected in the system since they are supplied from the same voltage source. Thus, the potentiometer supply voltage, power leads $a$ and $b$, is accordingly eliminated from calibration considerations. The cathode resistance of tube 101 is made up of resistor 105 with an adjustable series portion 106 enabling its resistance value to be precisely adjusted. Range switch 121 permits switching to a different value cathode resistance resistors 109 and 110. Potentiometers 108 and 120 are in series across the power lines $a$ and $b$. Adjusting potentiometer 108 feeds a variable bleeder current through resistor 107 and the cathode resistors 105 and 106. Likewise adjusting potentiometer 120 feeds a variable bleeder current through resistor 111 and the cathode resistors 109 and 110.

The rotor winding 61 of resolver 60 is connected in the plate circuit of tube 101. Thus plate voltage is supplied to tube 101 through rotor winding 61.

The plate current which flows in tube 101 is determined by the bias voltage setting of the range potentiometer 103 and the value of cathode resistance in the cathode circuit of tube 101. Thus, with the cathode resistance of resistors 105 and 106, set at a precisely fixed value, the cathode current and, therefore, the plate current will be proportional to the range bias voltage. Since there is a relatively large value of cathode resistance, the negative feedback of the cathode follower type of action which occurs greatly assists in stabilizing the circuit. Actual values of range bias voltage as used in practice considerably exceed 100 volts and this wide range of bias voltage minimizes tube variations. For a given value of cathode resistance a particular value of range bias setting will result in a corresponding value of resolver rotor current which will be linearly variable with respect to the range bias. Changing the cathode resistor will shift the relationship of range bias to a new value of resolver rotor current but still on a linear basis. This rotor current will, of course, be a steady state value and will induce no voltage into the stator windings 63 and 64 but will set up a corresponding intensity of magnetic field.

When the negative cursor pulse is applied to the grid 100 of tube 101 the tube plate current is interrupted and the resolver electrically disconnected from tube 101. This interrupts the steady state current and the magnetic field previously established. As the field collapses an oscillatory current is set up between the rotor winding inductance and the capacitor 122 shunted across the rotor winding 61.

Thus, a damped oscillatory voltage is set up which on the plate side of the rotor winding starts from zero and rises in a positive direction. The frequency of the oscillation depends upon the inductance of rotor winding 61 and the capacity of capacitor 122. This frequency is selected so that approximately the first ¼ cycle occurs in the cursor pulse duration time. This will make visible only the portion of the cathode ray tube beam movement from its reference position to the maximum peak voltage, the remainder of the beam movement not being illuminated. Since this peak voltage will be proportional to the magnetic flux in the resolver which in turn is proportional to the tube plate current and thus the range bias voltage, this cursor peak voltage will be proportional to the range potentiometer setting.

A diode 123 in series with resistor 124 is shunted across the resolver rotor winding 61. The polarity of the diode is such that the circuit is non-conducting on the positive half of the oscillatory cycle but conducts when the voltage swings in the negative half of the cycle. Accordingly, the oscillatory energy is dissipated. The resistance of the diode circuit is adjusted to perform this in the quickest time so that the circuit is restored as quickly as possible to the steady state condition as soon as the cursor pulse passes.

The two stator windings 63 and 64 as previously explained give the two necessary vector components.

The attenuation with range function serves to reduce the intensity or brightness of targets as a function of their distance from the center of the target display on the cathode ray tube, in this case own target's position. Series resistors 76 and 77 across line 26 and the cathode of the cathode follower 37 yield to line 80, target $x$ relative position voltages in the same manner as the adder resistors 29 and 30 except that there are no superimposed cursor signals.

Similarly series resistors 78 and 79 disposed across the cathode of cathode follower 38 and the line 27 yield to line 81, target $y$ relative position voltages without cursor signal in the same manner. Thus, the signal on the line 81 is similar to the signal on lead 34 without the cursor signal.

The $x$ adder circuit output from resistors 76 and 77 connect by the lead 80 to the attenuation with range circuit 83 and the $y$ adder circuit output from resistors 78 and 79 connect via lead 81 to the attenuation with range circuit 83.

These target $x$ and $y$ relative position voltages which are stepped voltages are processed into push pull step voltages and their negative polarities selected in the attenuation with range circuit 83 as will be more fully explained. The resultant negative step voltage is fed via lead 84 to the mixer and video amplifier 55 where it is mixed with the target brightening pulses. The steps of the step voltage vary in negative amplitude with the distance of the target from the center position. That direction which is the greatest distance controls the step. Thus, since the target brightening pulses are positive, the step voltage adjusts their heights as a function of distance from the center position voltage. The result is that the targets appear less bright on the cathode ray tube screen as their distance from the center increases. Eventually they will fall below video amplifier cut-off and disappear. The point at which this occurs depends upon the initial amplitude of the target brightening pulses and the step voltage amplitude. Thus considerable flexibility of characteristics and simulation ability is available. Further modification is available through a choice of voltage parameters in conjunction with vacuum tube characteristics.

The description of the attenuation with range circuit is made with reference to the schematic diagram of FIG. 3. The target $x$ relative position voltages are fed by the input line 80 to phase inverter push pull amplifier 125 of the attenuation with range circuit 83. Similarly, the target $y$ relative position voltages are fed by input 81 to phase inverter push pull amplifier 126 of the attenuation with range circuit 83. Grid input resistor 127 in series with adjustable resistor 128 provides means for referencing the input voltage to the bias reference voltage obtained from the tap on bias resistor 131 in the cathode circuit of bias cathode follower 70. This arrangement permits balancing the output of the phase inverter amplifier 125 as delivered by the respective plate resistors 132 and 133.

Resistor 150 connected between the grids of the phase inverter amplifier 125 acts as an input loading or attenuating resistor and determines the input signal amplitude without disturbing the balance of the phase inverter amplifier 125. Resistor 151 accomplishes the same function for the phase inverter amplifier 126. The resistors 150 and 151 determine therefore the step amplitude output and thus the degree of target brightening pulse amplitude output across cathode load resistor potentiometer 145 at any given target distance and function to control the attenuation with range rate.

The D.C. phase inverter amplifier 125 operates as follows: A stepped target $x$ relative position voltage signal is applied to the grid of the left hand triode of the dual triode tube 125. Since this is obtained from the adder resistors 76 and 77, it is relative $x$ position information with own ship's position always at the center reference voltage. This center reference voltage corresponds to the steady bias voltage which is applied to the grid of the right hand triode section. With the input grid at the center reference voltage both tubes draw equal plate currents. Thus, if the signal is larger than this center referencing voltage it will be applied to the grid as a positive direction signal to cause the tube to become more conductive. The voltage drop across plate resistor 132 will then correspondingly increase so as to yield a negative going or phase inverted output. On the other hand, the voltage drop across the common cathode resistor will also increase to cause the cathode bias on the right hand triode to increase so as to impede current flow through the plate resistor 133. The resulting reduction in voltage drop across the plate resistor 133 causes a positive direction output voltage which is in phase with the tube input. Similar analysis of tube operation will reveal that with a negative signal of an amplitude less than the grid biasing voltage the reverse voltage directions will be obtained in the push pull output of amplifier 125. Accordingly, a negative going pulse will be produced by the phase inverter from one or the other of plate output resistors 132 and 133 regardless of the target's $x$ position with reference to own ship's position. Also the magnitude of the output will be proportional to the input magnitude away from center or own ship's position. The D.C. phase inverter amplifier 126 operates identically to amplifier 125 as described.

Phase inverter amplifier 126 performs a similar function for the target $y$ relative position voltage with the push pull or phase inverted outputs appearing across load resistors 134 and 135. Grid input resistor 129 with adjustable resistor 130 perform the same balancing function of the $y$ input against the same bias reference from the tapped resistor 131 as with $x$ position phase inverter amplifier 125.

Diodes 136, 137, 138 and 139, respectively, have their cathodes connected to the outputs of the two phase inverter amplifiers across load resistors 132, 133, 134 and 135, respectively. Resistor 140 of high resistance value references the bus 149 and hence the common plate connections of the diodes to a positive voltage. Whichever cathode of the four diodes 136, 137, 138 and 139 is most negative, that diode will then conduct and reference the bus 149 and the diode plates to it. The remaining diodes since their cathodes are more positive will be non-conducting. Thus, the most negative relative target position with respect to own ship's position determines the voltage level of the bus 149. Therefore, since this bus voltage will be used to set the targe brightening pulse amplitude that dimension of the four target coordinate positions which is greatest will have control.

When the commutator moves to the next contact position, the circuits re-evaluate that target's position in a like manner. The output as appearing on bus 149, therefore, will consist of a series of step voltages the changes being proportional in a negative direction to the distance of a target from the reference own target at center regardless of bearing position. The most positive value the step voltage can have is when a target is at own target or center position.

Tubes 147 and 148 have their cathodes tied together and to a common cathode resistor potentiometer 145. The grid bias of tube 148 is set by a positively referenced potentiometer 142 through grid resistor 143. This bias controls the plate current flow of tube 148 and since it flows in the common cathode resistor 145 also in turn determines the bias on tube 147. This bias is adjusted so that with the step voltage on bus 149, tube 147 is on the threshold of conducting when the step voltage on bus 149 is at its most positive value corresponding to own target's center position. Since any other value the step voltage could have will be more negative, tube 147 will be beyond cut-off by a degree proportional to a target's position from own ship's position.

Target brightening pulses from cathode follower 54 are fed on lead 150ª to the bus 149 through a coupling capacitor 141 whose impedance is properly chosen with reference to the circuit impedance of bus 149. In this manner, the brightening pulses are superimposed upon the described step voltage. The output of tube 147 which appears across the cathode resistor 145 will show only voltages which exceed the cut-off point. Thus a target at own ship's center position will have full amplitude but target brightening pulses at other positions would be reduced in amplitude by an amount depending upon the negative value of the step voltage below the cut-off bias. Thus, the amplitude of a target brightening pulse is attenuated as a function of range or target's position from own target's center position.

The cursor brightening pulse from potentiometer arm 98 is fed through coupling capacitor 144 to the grid of bias control tube 148. Since this pulse is also in the positive direction, it also appears across cathode resistor potentiometer 145 and is mixed with the range attenuated pulses. The potentiometer 145 allows an adjustable video level to be fed out through its arm 152 to the video amplifier 146 and to the cathode ray tube grid 56 which displays the target pattern.

It is apparent from the description that a highly flexible system of display features and component combinations is possible and their enumeration has not been detailed in the interest of clarity and simplicity of description of the basic system, and it is understood that one skilled in the art may effect modifications of the system and particularly the character of the individual components thereof without departing from the scope of invention as defined in the appended claims.

What is claimed is:

1. A multiple target display system comprising a power source, a plurality of target units connected to said power source, each of said target units including a pair of adjustable ganged voltage control elements and a second pair of adjustable ganged voltage control elements, the voltage control elements of each pair being connected across said power source with reverse polarity to each other, a mechanical switch having several sets of corresponding target unit contacts, one element of each pair of elements in the target units being connected separately to corresponding target unit contacts of said switch, target brightening means connected to one of the several sets of contacts, said switch having arms adapted to engage separately the several sets of contacts and arranged to sequentially sample corresponding contacts, a pair of voltage adding means for averaging the output voltages of each pair of voltage control elements, one of said adding means being connected to one of said arms and to a voltage control element of one pair of voltage control elements, the other adding means being connected separately to another one of said arms and to a voltage control element in the other pair of voltage control elements, a display member connected to said target brightening means, said member having a pair of beam positioning elements with each of said elements connected separately to one of said adding means.

2. A multiple target display system as claimed in claim 1 wherein voltage isolating means are provided in the connections of said voltage control elements and said adding means and in the connections of said arms and said adding means whereby the voltage control elements are substantially relieved of loading effects.

3. A multiple target display system as claimed in claim 1 wherein there are provided amplifying means in the connections between each of said adding means and its respective beam positioning element of the display member, said amplifying means comprising D.C. phase inverting, push pull amplifiers, there being means to provide to said phase inverting amplifiers a reference voltage which is midpoint of said power source.

4. A multiple target display system as claimed in claim 3 wherein a cathode follower is provided in said reference voltage providing means, whereby said midpoint voltage will be substantially steady and unaffected by subsequent loading.

5. A multiple target display system as claimed in claim 4 wherein there are provided variable circuit loading means connected between the input of each of the amplifiers and the output of said cathode follower in said reference voltage providing means whereby the scale factor of the display member may be controlled.

6. A multiple target display system as claimed in claim 1 wherein a buffer resistor is disposed in each of the connections between said voltage control elements and said switch, and a buffer resistor is connected in series with the arm adapted to engage the set of contacts for said target brightening means whereby the contacts and arms of said switch are protected from excessive current flow.

7. A multiple target display system as claimed in claim 1 wherein the target brightening means includes a pulse differentiator for sharpening each target brightening pulse, and the contacts for said target brightening means and their associated arm are arranged to provide a phase delay in their output with respect to the sampled output of corresponding voltage control elements whereby time is allowed for the stabilization of the output of the beam positioning elements before the target 8. A multiple target display system as claimed in claim 7 wherein said target brightening means includes means for adjusting the amplitude of the target brightening pulse.

9. A multiple target display system as claimed in claim 1 in which means are connected to two of the voltage control elements and said target brightening means for attenuating the output of said target brightening means with respect to some reference voltage selected from the power source.

10. A multiple target display system comprising a power source, a plurality of target units connected to said power source, each of said target units including a pair of coordinate, adjustable and ganged voltage control elements and a second pair of coordinate, adjustable and ganged voltage control elements, a switch having several sets of corresponding target unit contacts, each contact of a corresponding pair of contacts being connected separately to one of said voltage control elements in a target unit, target brightening means connected to one of the several sets of contacts, said switch having arms adapted to engage separately the several sets of contacts and arranged to sequentially sample corresponding contacts, a pair of voltage adding means for averaging the output voltages of each pair of voltage control elements, each of said adding means being connected separately to one of said arms and to one of said voltage control elements, a display member connected to said target brightening means, said member having a pair of beam positioning elements with each of said elements connected separately to one of said adding means, a second pair of voltage adding means for averaging the output voltages of each pair of voltage control elements with each of said second pair of adding means being connected separately to one of said arms and to one of the voltage control elements, means being connected to each of said second pair of voltage adding means and to said target brightening means for attenuating the output of said target brightening means in accordance with the ouput of said second pair of voltage adding means.

11. A multiple target display system as claimed in claim 2 in which there are provided a second pair of adding means, each of said second pair of adding means being connected separately to one of said arms and to one of said voltage control elements, a pair of D.C. phase inverting push pull amplifiers are connected, respectively, to said second pair of adding means, each of said amplifiers having a midposition voltage referencing means and means connected to their input for balancing the amplifiers with respect to said referencing means, and means for selectively combining the output of said amplifiers with the target brightening pulses for attenuating their amplitude as a function of the target's position voltage with respect to the midpoint position voltage.

12. A multiple target display system as claimed in claim 11 in which a resistor is connected from the input of each amplifier to said midposition voltage referencing means whereby the input signal amplitude is controlled for the purpose of establishing the rate of target brightening pulse attenuation.

13. A multiple target display system as claimed in claim 1 wherein there is provided a cursor generating circuit for measuring other target range and bearing, said circuit being connected on its input side to the switch contacts for said target brightening means and to said power source and coupled on its output side to each of said adding means, a second output connection from the cursor circuit to the connection of said target brightening means and said display member, and there is provided an input shaft in control of the amplitude of the circuit output and settable in accordance with target range, and a second shaft in control of the coupling of said output and adding means and settable in accordance with target bearing.

14. A multiple target display system as claimed in claim 13 wherein a switch is inserted in the connection between the contacts for the target brightening means and the cursor generating circuit whereby the pulse from any one of the said set of contacts may be selected for the purpose of generating the cursor.

15. A multiple target display system as claimed in claim 13 wherein said cursor generating circuit comprises a limiting amplifier for shaping and controlling the pulse as received from the switch contacts, a push pull, phase inverting amplifier connected to said limiting amplifier for further shaping the pulse and providing a positive pulse for said second output connection and a negative pulse, a cursor generating tube connected to receive said negative pulse, a bias controlling potentiometer excited by said power source and operated by said first shaft, a resistor in the cathode circuit of said tube, an oscillatory circuit connected in the plate circuit of said tube, a resolver comprising at least a rotor winding and two stator windings in quadrature relationship, said rotor winding being in said oscillatory circuit and operated by said second shaft and said stator windings providing the coupling to the respective adding means.

16. The system as claimed in claim 15 wherein selective dampening means is shunted across said oscillatory circuit for the purpose of absorbing the residual oscillatory voltage.

17. The system as claimed in claim 15 wherein the resistance of said cathode resistor in the cathode circuit of said tube is selectively adjustable.

18. A cursor generating circuit comprising a limiting amplifier for shaping and controlling an input pulse, a push pull, phase inverting amplifier connected to said limiting amplifier for further shaping the pulse and providing a positive pulse for said second output connection and a negative pulse, a cursor generating tube connected to receive said negative pulse, a bias controlling potentiometer in biasing control of said tube, a resistor in the cathode circuit of said tube, an oscillatory circuit connected in the plate circuit of said tube, a resolver comprising at least a rotor winding and two stator windings in quadrature relationship, said rotor winding being in said oscillatory circuit and said stator windings providing the coupling to the circuit output.

19. The circuit as claimed in claim 18 wherein selective dampening means is shunted across said oscillatory circuit for the purpose of absorbing the residual oscillatory voltage.

20. The circuit as claimed in claim 19 wherein the resistance of said cathode resistor in the cathode circuit of said tube is selectively adjustable.

21. An attenuating circuit comprising a pair of D.C. phase inverting push pull amplifiers adapted to receive a pulse of a given amplitude, each of said amplifiers having a midposition voltage referencing means for establishing a relative reference point for the amplitude of said pulse, means connected to the input of each amplifier for balancing the amplifier with respect to said referencing means, means for selectively combining the output of said amplifiers with a second input to said circuit for attenuating the amplitude of said second input as a function of the selected output of said amplifiers.

22. An attenuating circuit as claimed in claim 21 in which a resistor is connected from the input of each amplifier to said midposition voltage referencing means whereby the input signal amplitude is controlled for the purpose of establishing the rate of attenuation of said second input.

References Cited in the file of this patent

UNITED STATES PATENTS

| | | |
|---|---|---|
| 2,439,050 | Mallory | Apr. 6, 1948 |
| 2,463,529 | Ferrill | Mar. 8, 1949 |
| 2,466,590 | Jacobs | Apr. 5, 1949 |
| 2,561,475 | Jacobsen | July 24, 1951 |
| 2,604,705 | Hisserich et al. | July 29, 1952 |
| 2,715,182 | Bishop | Aug. 9, 1955 |
| 2,743,357 | Casey | Apr. 24, 1956 |
| 2,806,946 | Rich | Sept. 17, 1957 |
| 2,858,475 | Blake | Oct. 28, 1958 |

FOREIGN PATENTS

| | | |
|---|---|---|
| 756,805 | Great Britain | Sept. 12, 1956 |